United States Patent [19]

Bechara et al.

[11] 4,040,992

[45] Aug. 9, 1977

[54] CATALYSIS OF ORGANIC ISOCYANATE REACTIONS

[75] Inventors: Ibrahim S. Bechara, Boothwyn; Felix P. Carroll, Chester; Dewey G. Holland, Chadds Ford; Rocco L. Mascioli, Media, all of Pa.

[73] Assignee: Air Products and Chemicals, Inc., Allentown, Pa.

[21] Appl. No.: 600,015

[22] Filed: July 29, 1975

[51] Int. Cl.$^2$ .............................................. C08G 18/18
[52] U.S. Cl. .................. 260/2.5 AW; 260/2.5 AC; 260/77.5 AC; 260/77.5 NC; 544/180
[58] Field of Search .................. 260/2.5 AW, 2.5 AC, 260/77.5 NC, 77.5 AC, 248 NS

[56] References Cited

U.S. PATENT DOCUMENTS

| 2,842,506 | 7/1958 | Roussel | 260/2.5 AC |
|---|---|---|---|
| 2,932,621 | 4/1960 | Terry | 260/2.5 AC |
| 3,010,963 | 11/1961 | Erner | 260/77.5 AC |
| 3,892,687 | 7/1975 | Bechara et al. | 260/2.5 AW |
| B 490,946 | 2/1976 | Bechara et al. | 260/2.68 |
| B 497,194 | 2/1976 | Bechara et al. | 136/89 PC |

*Primary Examiner*—Eugene C. Rzucidlo
*Attorney, Agent, or Firm*—Richard A. Dannells; Barry Moyerman

[57] ABSTRACT

Polymerization and condensation reactions of organic isocyanates are catalytically promoted by the use of N-hydroxyalkyl quaternary ammonium carbonylate salts, particularly in the production of polyisocyanurates and polyurethanes. Among the exemplary preferred catalysts are N-hydroxypropyl trimethyl ammonium salts of carboxylic acids such as those of formic and acetic acids and of fatty acids such as hexanoic and octanoic acids and the like.

25 Claims, No Drawings

CATALYSIS OF ORGANIC ISOCYANATE REACTIONS

BACKGROUND OF THE INVENTION

1. Field of the Invention

This invention relates to hydroxyalkyl quaternary ammonium carboxylate compounds used as catalysts for promotion of reactions involving organic isocyanates, as in the production of polyisocyanurates and polyurethanes.

2. Prior Art

The use of certain quaternary ammonium compounds in the production of polyurethane resins is disclosed in prior patents, for example, in U.S. Pat. Nos. 2,779,689 and 2,981,700. The activity of these compounds depends upon their decomposition to liberate the corresponding tertiary amines. Typical of these suggested quaternary ammonium compounds are the neutral salts formed by reaction of a tertiary amine, such as N-methyl morpholine, with acetic anhydride. The quaternary salts of this type, in general have lower catalytic activity than the tertiary amines from which these are derived.

Fabris et al in U.S. Pat. No. 3,726,816 lists a number of quaternary ammonium bases stated to be known in the art as catalysts in polyurethane reactions, including among these benzyl trimethyl ammonium hydroxide and heterocyclic quaternary ammonium hydroxides such as N-methyl pyridinium hydroxide and morpholinium bases. The patent also mentions the corresponding alkoxides, aryloxides and aralkoxides as exemplified, among others named, by benzyl trimethyl ammonium methoxide and ethoxide, and tetramethyl ammonium phenoxide. The patent proposes the use of these quaternary ammonium bases in polyurethane formulations in conjunction with compounds effective in neutralizing the quaternary base, so as to produce low odor polyurethane foams.

Erner in U.S. Pat. No. 3,010,963 discloses the preparation of quaternary hydroxyalkyl bases of diazabicyclo-octane and of imidazole by reacting the corresponding diazine or diazole with alkylene oxide and water. The obtained quaternary hydroxide can be further reacted with mineral acid or certain named organic acids to produce salts. Thus, the patent describes the production of N-N' bishydroxypropyl diazabicyclo-octane dihydroxide and conversion of the same to salts by reaction respectively with sulfuric, cresylic, salicyclic and phosphoric acids. The sulfates and phosphates are stated to have powerful inhibitory action on the growth of certain micro-organisms such as yeasts, molds and lactobacilli. The patent does not describe any specific use for the organic acid salts. In another example of the patent, the quaternary hydroxide obtained by reaction of 2-methyl imidazole with propylene oxide and water, is converted to the acetate salt, which was tested as a polymerization promoter in polyurethane foam reactions when used in association with the theretofore known highly active diazabicyclooctane catalyst.

Lambert et al, U.S. Pat. No. 3,108,975 is concerned with the production of water blown polyurethane foams from polyether polyols having predominantly secondary hydroxyl end groups. The patent proposes for use as catalysts in this reaction, optionally in the presence of known tertiary amine catalysts, certain basic compounds such as hydroxides of alkali or alkaline earth metals, or of fully substituted quaternary ammonium radicals; or salts of the foregoing. Among the quaternary ammonium radicals listed are those of N-methyl pyridinium, benzyltrimethyl ammonium and trimethyl cyclohexyl ammonium. Among possible salts the patent lists generally alkoxides, phenoxides, carboxylates, carbonates and others. The patent contains no specific example using the disclosed quaternary ammonium salts as catalysts or otherwise in the production of polyurethanes nor in other polyisocyanate reactions.

In copending application, Ser. No. 377,446 filed July 9, 1973 now abandoned, methods are disclosed for synthesis of certain acyclic quaternary hydroxyalkyl ammonium alkoxides and phenoxides useful, among other suggested purposes as catalysts for making polyurethane and polyurethane - polyisocyanurate foams; their use for such purpose is claimed in a simultaneously filed companion application Ser. No. 377,447, now U.S. Pat. No. 3,892,687, issued July 1, 1975.

In copending application Ser. No. 490,946 filed July 23, 1974, now U.S. Pat. No. 3,993,652, issued Nov. 23, 1976, phenoxides of certain cyclic quaternary ammonium bases containing an hydroxyalkyl group attached to the hetero N, are disclosed and claimed as catalysts in reactions involving organic isocyanates, such as in the formation of polyisocyanurates, polyurethanes, and polyurethane-polyisocyanurate resins.

SUMMARY OF THE INVENTION

In accordance with the present invention organic isocyanate reactions are promoted by catalytic amounts of N-hydroxyalkyl quaternary ammonium salts corresponding to the general formula

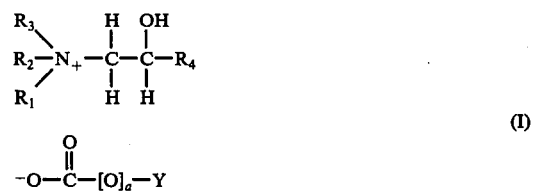

(I)

wherein $a$ = zero or one, $R_1$, $R_2$ and $R_3$ are independently alkyl or hydroxyalkyl groups of 1 to 20 carbon atoms, or cycloalkyl groups of 3 to 8 carbon atoms, aralkyl (e.g. benzyl), aryl (e.g. phenyl), alkenyl of 2 to 20 carbon atoms, or alkynyl of 2 to 6 carbon atoms, or $R_1$, $R_2$ and $R_3$ together constitute a heterocyclic structure from the group consisting of triethylene diamine, methyl triethylene diamine, quinaclidine, N-methyl morpholine, N-ethyl morpholine and N,N'-dimethyl piperazine;

$R_4$ is H, phenyl, an alkyl group of 1 to 15 carbon atoms, an alkenyl group of 2 to 15 carbon atoms, an alkynyl group of 2 to 6 carbon atoms, a hydroxy alkyl group of 1 to 9 carbon atoms, a keto alkyl group having a total of 3 to 15 carbon atoms, or an alkoxy alkyl group having a total of 2 to 20 carbon atoms;

Y is H, an alkyl group of 1 to 20 carbon atoms, an alkenyl group of 2 to 15 carbon atoms, a cycloalkyl group of 3 to 6 carbon atoms, phenyl, an alkyl phenyl having 1 to 9 carbon atoms in the alkyl group or groups attached to the phenyl ring, benzyl, an alkyl benzyl having 1 to 9 carbon atoms in the alkyl group or groups attached to the ring, or a $CH_{(3-b)}Z_{(b)}$ group, wherein b = 1 to 3 and Z is OH, CN, Cl, and alkoxy group of 1 to 5 carbon atoms, a phenyl group or methoxy phenyl group, or Z is (CH$_2$)$_d$COOR wherein d is equal to zero to 4 and R is hydrogen or an alkyl group of up to 20 carbon atoms.

The preferred compounds are those corresponding to the formula:

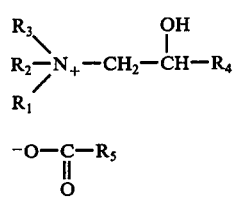

(Ia)

wherein R$_1$ to R$_4$ are as previously defined and R$_5$ is hydrogen, an alkyl group of 1 to 18 carbon atoms, an alkenyl group of 2 to 15 carbon atoms, benzyl or methoxy benzyl. Of particular preference are the hydroxy propyl trimethyl ammonium salts of formic acid and of fatty acids having up to 10 carbon atoms, including those of hexanoic and various decanoic acids.

The preferred route for preparation of the hydroxyalkyl quaternary ammonium carbonylates of the invention as indicated above, is by reaction of a tertiary amine with an alkylene oxide in the presence of the carboxylic acid. If the corresponding ammonium compound is commercially available as the hydroxide, formation of the desired carboxylate can be directly obtained by reaction of the quaternary ammonium base with the desired carboxylic acid. While many of the compounds herein disclosed have not heretofore been synthesized, it is noted that certain quaternary salts falling without the scope of formula I above, particularly choline salts or organic acids, have hitherto been disclosed for use as pharmaceuticals. Other di (hydroxyalkyl) compounds falling within the general formula (I) have been previously suggested for use as emulsifiers, wetting agents and the like (see U.S. Pat. No. 2,759,975). None of these prior art disclosures, however, suggest the advantageous use of these compounds as catalysts in base-catalyzed reactions of the type herein described.

Many of the prior art catalysts proposed for production of isocyanurate resins promote too rapid reaction between the polyol and the isocyanate at the expense of trimerization of the isocyanate to desired isocyanurate structures. This drawback is overcome by the catalysts of the present invention, since the presence of the hydroxyalkyl group in the cation serves to influence the activity of the quaternary ammonium catalyst within limits to obtain the desired extent of isocyanate polymerization.

QUATERNARY SALT PREPARATION

Among the tertiary amines that may be employed for reaction with the alkylene oxide and carboxylic acid to obtain the compounds used in accordance with the invention in general, there may be mentioned those amines containing 0 to 3 hydroxyalkyl groups and one or more alkyl, cycloalkyl or aryl groups attached to the N. Particular tertiary amines that have been so employed include: trimethyl amine, N-dimethyl-N-hydroxyethyl amine, N-benzyl-N-dimethyl amine, N-di(hydroxyethyl)-N-phenyl amine, triethanolamine, N-cyclohexyl-N-dimethyl amine, N-methyl morpholine, triethylene diamine, quinuclidine.

Among the particular alkylene oxides that have been employed with the foregoing and other tertiary amines, there are included: ethylene oxide, propylene oxide, styrene oxide, glycidol, and longer chain alkylene oxides such as those available commercially under the trade mark Nedox (Ashland Chemical Co.) corresponding to the formula

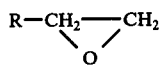

wherein R is a long chain alkyl group or a mixture of such groups having up to 15 carbon atoms.

Any one of a large variety of carboxylic acids may be employed to furnish the anion of the desired quaternary ammonium salt. Among these, compounds of the above formula I are obtained with short to long chain fatty acids; substituted aliphatic acids; and aromatic carboxylic acids. Particular reference is given to formic, acetic, hexanoic, straight and branched chain heptanoic, octanoic, decanoic, and hexadecanoic acids; neo acids such as 3,3-dimethyl butanoic acid; unsaturated aliphatic acids such as oleic, acrylic, methacrylic, undecenoic, and aromatic acids such as benzoic, phenylacetic and salicylic.

Alkyl and phenyl carbonic acid salts can be formed by carbonylation of the corresponding quaternary ammonium alkoxides or phenoxides with CO$_2$.

In the usual method of preparation of the desired hydroxyalkyl ammonium compounds, equivalent amounts of a tertiary amine, a carboxylic acid and an alkylene oxide are mixed preferably in the presence of a suitable solvent such as dipropylene glycol. The reaction is carried out at a temperature in the range of 25°–60° C and at about atmospheric pressure, although higher pressures may be employed, if desired, as up to 35 atmospheres. Example I below illustrates a typical preparation. Other examples below generally follow the same procedure with possible minor modification in temperature, selection of solvent or its omission.

DETAILED DESCRIPTION

EXAMPLE 1

Into a flask equipped with a stirrer, a reflux condenser and an addition funnel, there was charged 232 grams of dipropylene glycol (DPG) and 90 grams of glacial acetic acid. To this mixture trimethyl amine was bubbled in until a gain of 87 grams was attained. 87 grams of propylene oxide were then added slowly at 25° C while the mixture was stirred. After the addition of the propylene oxide was completed the mixture was permitted to stir at ambient temperature overnight, then it was vacuum stripped for six hours at 45° C to remove the unreacted volatile materials. The residue after stripping weighed 484 grams.

Titration of the residue gave 50.4% by weight of quaternary amine as compared with a theoretically possible 52.5%. The nuclear magnetic resonance analysis showed this product to contain 45.5 mol% quaternary amine and 53.5 mol% dipropylene glycol.

EXAMPLES 2 to 6

Following the same procedure as described above other compounds were prepared employing the reactants and solvents indicated in Table 1 below obtaining the yields reported.

EXAMPLE 7

Into a flask containing about one mol of 2-ethyl-hexanoic acid (144 grams), trimethyl amine was bubbled in until there was realized a gain in weight equal to one mole of the amine (60 grams). To the mixture was added about one mol (58 grams) of propylene oxide and stirring continued for eighteen hours.

The NMR data which is summarized in Table 2 below, confirms the structure of the compound.

EXAMPLE 8

Following the procedure set out in Example 7 above, isodecanoic acid was reacted with equal molar quantities each of trimethylamine and propylene oxide to obtain trimethyl-N-2-hydroxypropyl ammonium isodecanoate which structure was confirmed by NMR analysis as reported in Table 2.

TABLE 1

| Amine | Acid | Alkylene Oxide | Solvent | Analysis by NMR mol% quat. N | mol% tertiary N | mol% DPG | Example |
|---|---|---|---|---|---|---|---|
| Trimethyl | acetic | propylene | DPG | 46.5 | 0.00 | 53.5 | 1 |
| Trimethyl | formic | propylene | DPG | 41.5 | 0.00 | 58.5 | 2 |
| Quinuclidine | acetic | glycidol | DPG | 38.1 | 0.00 | 61.9 | 3 |
| Triethylene diamine | formic | propylene | None | 55.0 bis 29.0 mono | 0.00 | 16.0* | 4 |
| N-methyl morpholine | cyano- acetic | propylene | DPG | 30.6 | 22.2 | 47 | 5 |
| Trimethyl | dichloro acetic | ethylene | water and methanol | 100. | 0.0 | 0.0 | 6 |

*Probably propylene glycol resulting from hydrolysis of propylene oxide.

The resulting clear and viscous liquid was analyzed by nuclear magnetic resonance (NMR) and was found to consist mainly of trimethyl-N-2-hydroxypropyl ammonium 2-ethyl hexanoate.

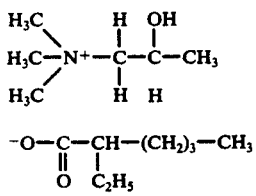

(II)

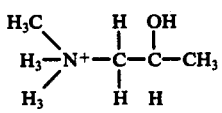

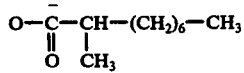

(III)

TABLE 2

NMR data of the 2-hydroxypropyl trimethyl ammonium carboxylates - Tier* salt used as a reference. $D_2O$ used as solvent.

| Example 7 | Functional Group | Chemical shift in ppm (multiplicity) | Area | No. of Proton | Area/H |
|---|---|---|---|---|---|
| Formula II | $(CH_3)_3N^+$ | 3.2 (singlet) | 80 | 9 | 8.8 |
| | >N—[CH$_2$]—C(H)— | 3.3 – 3.4 (doublets) | 18 | 2 | 9.0 |
| | —O—C(=O)—[CH—(CH$_2$)$_3$—CH$_3$ / CH$_2$ / CH$_3$] | 0.7 – 2.3 (complex) | 159.9 | 18 | 18.9 |
| | +—CH$_2$—C(H)(OH)—[CH$_3$] | | 87.1 | 15 | 5.8 (free acid) |

| Example 8 | Functional Group | Chemical shift in ppm (multiplicity) | Area | No. of Proton | Area/H |
|---|---|---|---|---|---|
| Formula III | $(H_3C)—N^+$ | 3.2 (singlet) | 69 | 9 | 7.6 |
| | >N$^+$—[CH$_2$]—C(H)— | 3.3 – 3.4 (doublet) | 16 | 2 | 8.0 |

TABLE 2-continued

NMR data of the 2-hydroxypropyl trimethyl ammonium carboxylates - Tier* salt used as a reference. D₂O used as solvent.

| Structure | Chemical shift | Area | No. of Proton | Area/H |
|---|---|---|---|---|
| —CH₂—[CH]—CH₃ with OH | 4.2 – 4.6 (complex) | 7 | 1 | 7.0 |
| —CH(OH)—[CH₃] + —O—C(=O)—[CH—(CH₂)₆—CH₃ with CH₃] | 0.7 – 2.3 (complex) | 172.0 / 65.4 (free acid) | 22 | 7.7 / 3.4 |

*Tier salt = 3-[trimethylsilyl]-propanesulfonic acid sodium salt.

EXAMPLE 9

Following the procedure set out in Example 7 above, 2-ethylhexanoic acid was reacted with equal molar quantities each of dimethyl ethanol amine and propylene oxide. The product obtained consisted of 87 mol% of the quaternary hydroxyalkyl compound and 13 mol% of unreacted tertiary amine. The quaternary hydroxyalkyl compound corresponds to the formula

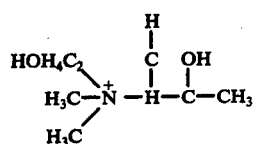

(IV)

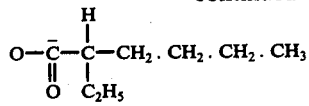

EXAMPLE 10

Into a flask containing 8.9 grams of dimethyl ethanolamine and 50 cc of water, there was added 5.8 grams of propylene oxide; a slight exotherm resulted. After the temperature of the reaction mixture cooled to room temperature, 7.6 grams of glycolic acid was added. After stirring for an hour the water was removed on a rotavac and the residue analyzed. The product contained 80 mol% of N,N bishydroxyalkyl-N,N dimethyl ammonium glycolate and 20 mol% of the glycolic acid salt of the amine.

TABLE 3

NMR data on N,N-dimethyl-N-hydroxyethyl-N-2-hydroxypropyl ammonium glycolate - TMS used as reference

| Example 10 | Functional Group | Chemical shift in ppm (multiplicity) | Area | No. of Proton | Area/H |
|---|---|---|---|---|---|
| Formula V | O=C(O—)—[CH₂]—OH | 4.0 – 4.2 (complex) | 66 | 5 | 14 |
| | H₂C—[H]—C—OH | 4.8 – 4.2 (complex) | 14 | 1 | 14 |
| | (H₃C)₂N⁺—[CH₂]—C / (H₃C)₂N⁺—[CH₂]—C and (H₃C)₂N⁺—[CH₂]—CH₂ | 3.9 – 3.3 (complex) | 64 | — | — |
| | —H₂C—CH₂\N⁺/[CH₃, CH₃]—CH₂—CH₂— | 3.2 (singlet) | 80 | 60 | 13.3 |

TABLE 3-continued
NMR data on N,N-dimethyl-N-hydroxyethyl-N-2-hydroxypropyl ammonium glycolate - TMS used as reference

| Example 10 | Functional Group | Chemical shift in ppm (multiplicity) | Area | No. of Proton | Area/H |
|---|---|---|---|---|---|
| | $-\overset{H}{\underset{|}{C}}-\boxed{CH_3}$ | 1.25 (doublet) | 37 | 3 | 12 |
| | $-\overset{H}{\underset{OH}{\underset{|}{C}}}-\boxed{CH_3}$ | 1.18 (doublet) | 6 | 3 | 2 |
| | $-\overset{CH_3}{\underset{H}{\underset{|}{N^+}}}\diagdown_{CH_3}$ | 2.9 (singlet) | 18 | 6 | 3 |

NMR analysis as shown in Table 3, confirmed that the quaternary ammonium glycolate formed corresponds to the formula $$\begin{array}{c} H_3C \diagdown \\ H_3C-N_+-CH_2-\overset{OH}{\underset{|}{CH}}-CH_3 \\ HOH_4C_2 \diagup \\ \\ ^-O-\underset{\underset{O}{\|}}{C}-CH_2OH \end{array} \quad \text{(V)}$$

EXAMPLE 11

To a flask containing 100 grams of trimethyl-N-2 hydroxypropyl ammonium phenoxide in 50% dipropylene glycol, carbon dioxide was bubbled in for several hours. The recorded weight gain corresponded to the stoichiometric amount needed for formation of the corresponding carbonate. The mixture was then heated at 40° C and stirred for 23 hours. No loss in weight was observed. The product was analyzed by infrared spectroscopy and the spectrum showed a distinct carbonyl band at about 1640 cm$^{-1}$ which corresponds to the carbonyl of the phenyl carbonate formed, evidencing a compound corresponding to the formula $$\begin{array}{c} H_3C \diagdown \quad H \quad OH \\ H_3C-N^+-\overset{|}{\underset{|}{C}}-\overset{|}{\underset{|}{C}}-CH_3 \\ H_3C \diagup \quad H \quad H \\ \\ ^-O-\underset{\underset{O}{\|}}{C}-O-\phi \end{array} \quad \text{(VI)}$$

Following the procedures outlined in Examples 1 to 11 above, other compounds of the invention can be similarly prepared by reaction of the appropriate tertiary amine with a carboxylic acid and suitable alkylene oxide. Thus, these come into consideration among the compounds corresponding to the general formulae I and Ia above. Specific examples of compounds of the above formulae useful in practice of the invention and which can be prepared by the methods set out in the specific examples, include:

EXAMPLE 12

N-trimethyl-N-2-hydroxypropyl ammonium 3-ethyl hexanoate $$\begin{array}{c} (H_3C)_3-N_+-CH_2-\overset{|}{\underset{OH}{CH}}-CH_3 \\ \\ ^-O-\underset{\underset{O}{\|}}{C}-CH_2-\overset{|}{\underset{C_2H_5}{CH}}-C_3H_7 \end{array} \quad \text{(VII)}$$

EXAMPLE 13 dimethyl N-hydroxyethyl-N-2-hydroxy propyl ammonium heptanoate $$\begin{array}{c} H_3C \diagdown \\ H_3C-N_+-CH_2-\overset{|}{\underset{OH}{CH}}-CH_3 \\ HOH_4C_2 \diagup \\ \\ ^-O-\underset{\underset{O}{\|}}{C}-C_6H_{13} \end{array} \quad \text{(VIII)}$$

EXAMPLE 14

N-trimethyl-N-2-hydroxypropyl glycolate $$\begin{array}{c} (CH_3)_3-N_+-CH_2-\overset{|}{\underset{OH}{CH}}-CH_3 \\ \\ ^-O-\underset{\underset{O}{\|}}{C}-CH_2OH \end{array} \quad \text{(IX)}$$

EXAMPLE 15

There can also be employed various alkylene oxides which can be quaternized with an amine and a substituted or unsubstituted carboxylic acid, for example, such as the compound obtained by the reaction of dimethyl aniline with dodecane oxide and cyanoacetic acid, corresponding to the formula:

$$\phi-\underset{\underset{CH_3}{|}}{\overset{\overset{CH_3}{|}}{N}}-CH_2-\overset{|}{\underset{OH}{CH}}-(CH_2)_9\cdot CH_3$$

-continued

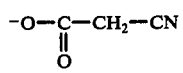 (X)

EXAMPLE 16

From reaction of ethylene oxide with phenyl diethanolamine and an unsaturated higher fatty acid such as undecylenic acid or oleic acid, quaternary ammonium compounds are obtained corresponding, for example, to the formula

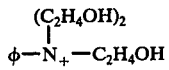

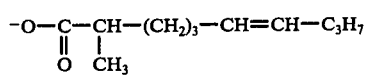 (XI)

EXAMPLE 17

Reaction of cyclohexyl dimethyl amine with propylene oxide and 3,3-dimethylbutanoic acid, resulting in quaternary ammonium compounds corresponding to the formula

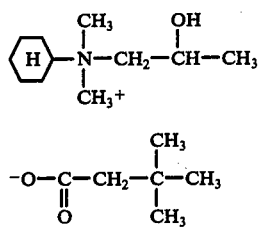 (XII)

EXAMPLE 18

Reaction of triethanolamine with propylene oxide and methoxy phenyl acetic acid, resulting in compounds of the formula

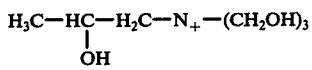

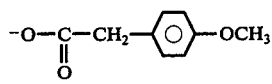 (XIII)

Other compounds useful in practice of the invention which can be prepared by the general method described above include:

N-methyl-N,N,bishydroxyethyl-N-2 hydroxy propyl ammonium acrylate

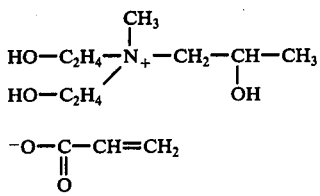 (XIV)

N-N dimethyl-N-2-hydroxypropyl N-2(hydroxyethoxy)ethyl ammonium methyl malonate

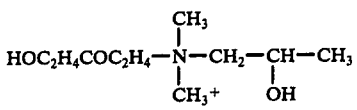 (XV)

N-hydroxyethyl-N-trimethyl ammonium pyruvate

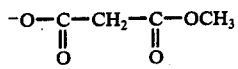

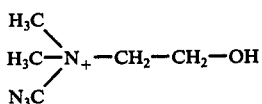 (XVI)

N-diethyl-N-hydroxyethyl-N-2 hydroxy phenethyl ammonium adipate

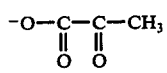

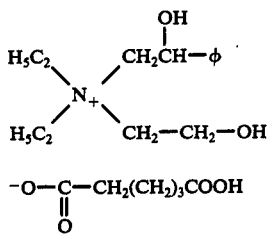 (XVII)

N-N dimethyl-N-ethoxy propyl-N-2-hydroxybutenyl ammonium benzylcarbonate

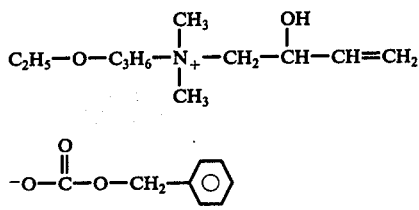 (XVIII)

Other compounds useful in practice of the invention can be prepared from various alkylene oxides capable of being quaternized by reaction with a tertiary amine and a substituted or unsubstituted carboxylic acid. Typical among these are the following:

The product obtained by reacting benzyl dimethyl amine with dodecane oxide and cyanoacetic acid, corresponding to the formula

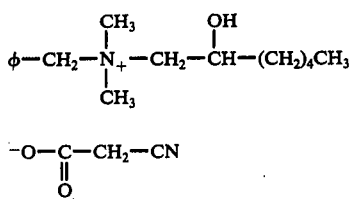 (XIX)

The product obtained by the reaction of dimethyl ethanolamine with ethylene oxide and malonic acid in dipropylene glycol solvent at low temperature (>55° C), corresponding to the formula

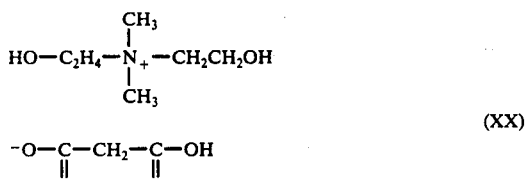

(XX)

The product obtained by the reaction N-N-dimethyl-N-octadecyl amine with propylene oxide and methoxy acetic acid corresponding to the formula:

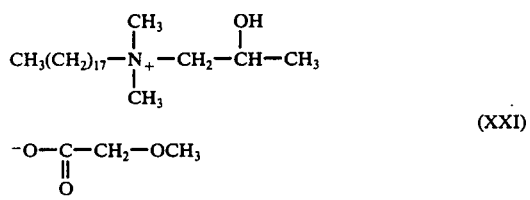

(XXI)

The product obtained by reaction N-N-dimethyl N-ethyl amine with glycidol and stearic acid, corresponding to the formula:

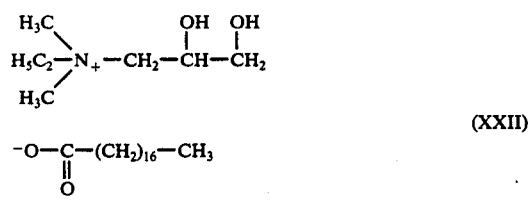

(XXII)

It will be understood that the particular compounds above outlined are merely representative of the wide variety of novel hydroxy alkyl quaternary ammonium carboxylates and hydrocarbyl carbonates that can be prepared and utilized in practice of the present invention. Any of the specific tertiary amines of the foregoing examples can be reacted with an alkylene oxide and any substituted or unsubstituted carboxylic acid of the types specifically delineated to obtain compounds of the generic formula useful in catalysis of organic isocyanate reactions for the production of polyurethanes and isocyanurate resins.

In any of the foregoing reactions solvents such as water, alcohols or glycols may be employed.

The hydroxyalkyl quaternary ammonium carboxylates can be employed in accordance with the invention, as catalysts in organic isocyanate reactions such as in the production of polyurethanes and polyisocyanurates. These quaternary compounds can be used tris or as co-catalysts with alkali metal salts of carboxylic or carbonic acids or with alkali metal salts of thio-carbonates and crown ethers. They can also be used as co-catalysts with well known tertiary amines active in reactions of isocyanates, such as triethylene diamine, N-ethyl morpholine, hexahydro triazines; 2,4,6 -tris dimethyl amino methyl phenol, tertiary alkanolamines, and their acid salts. The quaternary compounds of the invention can also be employed as co-catalysts with organo-metallic catalysts such as those derived from tin, antimony or lead; and with the known phosphine catalysts.

RESIN FORMULATIONS

The following example illustrates the activity of the quaternary ammonium carboxylates in trimerizing isocyanates.

EXAMPLE 19

To 20 parts by weight of phenyl isocyanate, there was added 0.3 parts of the compound of Example 7 (Formula II). Reaction was initiated immediately on shaking the mixture, obtaining a solidified mass. The solid mass was washed in toluene and the product on being weighed was found to correspond to a yield of about 93.6% of the total weight of the reactants. The melting point was found to be 285° C (reported m.p. of triphenyl isocyanurate is 284° C). The infrared spectra of the product taken in potassium bromide wafer showed the unmistakable isocyanurate bands at 1410-1420 cm$^{-1}$ and 1680-1700 cm$^{-1}$.

The following example illustrates the activity of several of the hydroxyalkyl quaternary ammonium carbonylates as catalysts in several runs made with a typical isocyanurate foamed resin formulation.

EXAMPLE 20

A polyisocyanurate premix was prepared of the following formulation

|  | pbw |
| --- | --- |
| * Mondur MR | 100 |
| * Voranol RS-350 | 20 |
| * Genetron 11SBA | 20 |
| * Silicone DC-193 | 1.5 |
| Catalyst | 1.5 |

The catalyst was admixed with the other components and the mixture stirred rapidly for ten seconds, then discharged into a tub of ample size and the rate of gel and rise times recorded, with each of the different catalysts employed. The data is summarized in Table 3 below.

*Mondur MR is 4,4'— methylene bisphenyl isocyanate of about 2.7 functionality, containing 31.5% NCO.

*Voranol RS-350 is a sucrose propylene oxide based polyol having an equivalent weight of about 160 and a molecular weight of 700–900.

*Genetron 11SBA is a monofluoro trichloro ethane.

* DC193 is a silicone surfactant comprising polysiloxane polyoxyalkylene block copolymers (U.S. Pat. Nos. 2,834,748 and 2,917,480).

The catalysts employed in the foregoing runs are identified in Table 4.

TABLE 4

| | CATALYST | Gel Time (secs.) | Rise Time (secs.) |
| --- | --- | --- | --- |
| a) | N,N-dimethyl-N-hydroxyethyl-N-2-hydroxypropyl ammonium hexanoate | 35 | 65 |
| b) | Trimethyl-N-2-hydroxypropyl ammonium hexadecanoate | 30 | 53 |
| c) | Trimethyl-N-2-hydroxypropyl ammonium 2-ethylhexanoate | 35 | 57 |
| d) | Trimethyl-N-2-hydroxypropyl ammonium phenylcarbonate (50% in dipropylene glycol) | 25 | 45 |

Certain of the quaternary ammonium compounds of the invention can be employed as delayed action catalysts in polyurethane and polyisocyanurate foamed resins, as illustrated in the following example.

EXAMPLE 21

Employing the same formulation as in Example 20 above, the catalyst employed was 2 parts by weight of N,N-dimethyl-N-hydroxyethyl-N-2-hydroxypropyl ammonium glycolate. No foaming reaction was observed. The same premix formulation was repeated and the mixture charged into an oven set at 250° F (121.1° C.) for 5 minutes, upon which a good foam was obtained.

The catalysts of the invention may be employed in standard formulation for rigid and flexible polyurethane foams, examples of which are given below:

|  | p.b.w. |
|---|---|
| *Selectrofoam 6406 | 109 |
| D. C. 193 | 1.5 |
| *Hylene TIC | 105 |
| Trichlorofluoromethane | 47 |
| Catalyst | 1.0 |

*Selectrofoam 6406 is a mixture of propylene oxide propanol derivative of sucrose and an alkylene oxide derivative of ethylene diamine having a molecular weight of about 800 (see U.S. Patent 3,153,002); manufactured by Pittsburgh Plate Glass Co.
*Hylene TIC is an undistilled toluene diisocyanate material which is a dark, brownish liquid typically having an NCO content of 38.75 to 39.75%, an amine equivalent of 105.5 to 108 and a viscosity at 25° C of 15 to 75 cps.

EXAMPLE 22

The following formulation is for a one-shot flexible polyurethane foam.

EXAMPLE 23

|  | p.b.w. |
|---|---|
| *Voranol CP3000 | 100 |
| *Silicone L-520 | 1.2 |
| Water | 3.6 |
| *T-9 Catalyst | 0.25 |
| *Hylene TM 80-20 | 45.5 |
| Quat. catalyst | 0.5 |

*Voranol CP3000 is a propylene oxide adduct of glycerine; OH No.56, MW 3000.
*Silicone L-520 is a polyalkylene oxide polysiloxane surfactant of Union Carbide and Chemical Company.
*T-9 catalyst is stannous octoate.
*Hylene TM 80-20 is a mixture of tolylene 2:4 and tolylene 2:6 diisocyanates.

EXAMPLE 24

The following polyisocyanurate formulation was employed in evaluation of the catalyst designated in Table 5 below:

| Component A | pbw |
|---|---|
| Voranol RS-350 | 24.0 |
| Blowing agent R11-sba | 25.0 |
| D.C. 193 surfactant | 1.5 |
| *Fyrol | 10.0 |

*Fyrol is 2[(tris dichloropropyl)phosphate].

| Component B |  |
|---|---|
| Mondur MR | 100.0 |

121.0 grams of Component A were weighted into a quart container and then 1.5 to 3.0 grams of the catalyst were added and the mixture stirred with a high speed mixer for 5 seconds. To the stirred mixture was then added 200 grams of Component B and the mixture again stirred mechanically for about ten seconds, then poured into a one gallon tub. The cream time, initiation time, string gel time and tack-free time and rise time were recorded and are shown in Table 5 below.

EXAMPLE 25

The activities of several of the catalysts were evaluated in the preparation of rigid polyurethane foams of the following formulation:

| Component A |  | pbw |
|---|---|---|
| (a) | Thermolin RF 230 | 107.5 |
| (b) | Poly GX-431 | 20.0 |
|  | Genetron 11SBA | 30.0 |
| (c) | LK-221 | 1.5 |
| (d) | TM 181 | 0.2 |
|  | Catalyst | as indicated |
| Component B |  |  |
|  | Mondur MR | 123.0 |

TABLE 5

| Catalyst of Example | % Cat used by weight of isocyanate | Cream time (sec.) | Initiation time (sec.) | Gel time sec. | Tack-free time (secs.) | Rise time (sec) |
|---|---|---|---|---|---|---|
| 1 | 1.0 | 30 | 34 | 50 | 63 | 80 |
|   | 1.5 | 17 | 19 | 25 | 32 | 40 |
| 2 | 1.0 | 31 | 37 | 47 | 55 | 74 |
|   | 1.5 | 29 | 32 | 36 | 42 | 57 |
| 3 | 1.5 | 19 | 23 | 37 | 53 | 69 |
|   | 3.0 | 8 | 12 | 17 | 20 | 31 |
| 4 | 1.5 | 45 | 55 | 100 | 110 | 140 |
|   | 3.0 | 20 | 23 | 60 | 73 | 100 |

(a) Chlorinated rigid foam polyol containing 47% by weight of chemically bound Cl. Hydroxyl No. = 365 ± 10; Acid No. = 0.8; Viscosity 100,000 cps at 25° C; specific gravity = 1.5.
(b) Amine polyol having a hydroxyl number of 600 ± 10; highly reactive, having a pH of 11.5 ± 1 and water content of 0.1% by weight.
(c) Cell stabilizer having a Brookfield viscosity at 23.3° C of 2000 cps, sp.g. of 1.036 and a pour point below 0° C; manufactured by Air Products and Chemicals, Inc.
(d) dialkyl tin mercaptide (s.g. = 1.19, viscosity = 50 cps at 23.85° C.

Foams were prepared by the usual "one-shot" method and the information recorded as given in Table 6 below. The foams were also examined for friability and density and these properties recorded. The results are compared with a control run using a typical tertiary amine catalyst.

TABLE 6

| Catalyst | conc. php | Cream Time (sec) | Gel time (sec) | Tack free (sec) | Rise time (sec) | Density No./ft³ (Kg/m³) | Surface Friability | % Friability cube method after 10 min. |
|---|---|---|---|---|---|---|---|---|
| N-N-dimethyl cyclohexyl amine (control) | 0.8 | 13 | 17 | 20 | 25 | 2.00 (32.04) | VS* | 4.80 |
|  | 1.0 | 8 | 12 | 18 | 20 | 1.97 (31.56) | VS | 2.02 |
| Trimethyl N-2 hydroxypropyl ammonium formate | 0.2 | 15 | 18 | 33 | 44 | 2.09 (33.48) | M** | 4.62 |
|  | 0.3 | 13 | 15 | 27 | 32 | 2.06 (33.0) | M | 5.69 |
|  | 0.4 | 12 | 16 | 20 | 26 | 2.03 (32.52) | M | 2.38 |

TABLE 6-continued

| Catalyst | conc. php | Cream Time (sec) | Gel time (sec) | Tack free (sec) | Rise time (sec) | Density No./ft³ (Kg/m³) | Surface Friability | % Friability cube method after 10 min. |
|---|---|---|---|---|---|---|---|---|
| Trimethyl N-2 hydroxypropyl ammonium 2-ethyl hexanoate | 0.2 | 15 | 18 | 30 | 40 | 2.18 (34.92) | VS | 2.97 |
| | 0.3 | 13 | 15 | 27 | 32 | 2.12 (33.96) | VS | 3.15 |
| | 0.4 | 12 | 16 | 19 | 23 | 2.07 (33.16) | VS | 1.42 |

*VS = very slight
**M = medium

EXAMPLE 26

A formulation comprising Component A of Example 25 and containing as catalyst trimethyl-N-2-hydroxypropyl ammonium 2-ethyl hexanoate, was stored over a period of time and periodically tested to determine retention of activity. As will be seen from the results reported in Table 7 below, this catalyst showed little or no loss in activity in an aging period of up to 70 days.

TABLE 7

| Cat. conc. (pbw) | Aging Period (days) | Cream Time (sec) | Gel Time (sec) | Tack Free (sec) | Rise Time (sec) |
|---|---|---|---|---|---|
| 0.3 | 3 | 12 | 17 | 28 | 37 |
| | 21 | 12 | 16 | 28 | 37 |
| | 35 | 13 | 16 | 28 | 38 |
| | 70 | 12 | 15 | 27 | 38 |
| 0.4 | 3 | 12 | 17 | 24 | 36 |
| | 21 | 13 | 16 | 25 | 35 |
| | 35 | 12 | 16 | 25 | 34 |
| | 70 | 12 | 14 | 25 | 35 |

The catalysts of the invention are compatible with the components generally employed in premixes and formulations for polyisocyanurate and polyurethane - polyisocyanurate resins, such as those containing fire retardant agents, blowing agents, pigments, fillers, and the like. Because of the surface active properties of these catalysts and the lowered viscosity of formulations containing the same, the need for solvents or plasticizers is minimized or obviated, affording improved processing latitude.

The catalysts of the invention can be employed to promote trimerization of aromatic isocyanates such as toluene diisocyanate, 4,4'-methylene bisphenyl isocyanate, polymeric isocyanates and the like. They can also be used to trimerize aliphatic isocyanates such as isophorone diisocyanate, hexamethylene diisocyanate, methylene bis cyclohexyl diisocyanate; as well as for trimerization of aralkyl isocyanates such as xylylene diisocyanate, and acyl and sulfonyl isocyanates.

The catalysts of the invention can also be used in the trimerization of the so-called prepolymers having terminal isocyanate groups. They are particularly useful in the trimerization of isocyanates in the presence of various diols, triols and other polyols of a wide range of molecular weights and hydroxyl content; including the typical polyether and polyester based polyols and aminopolyols, employed in the production of polyurethanes and polyisocyanurate resins.

The concentration of the catalyst in polyurethane formulations and for polyisocyanurate-polyurethane resins and foams may be in the range of 0.2 to 2 parts by weight per hundred parts of polyol and preferably in the range of 0.5 to 1.5 parts per hundred of the polyol.

For the production of triphenyl isocyanurate and other trimerized carbocyclic isocyanates the catalyst may be in the range of 1 to 2 parts per hundred of the isocyanate.

We claim:

1. In the process of promoting organic isocyanate condensation and/or polymerization reactions in the production of products containing respectively urethane and isocyanurate groups, the improvement which consists in utilizing for such promotion a catalytic quantity of a hydroxyalkyl quaternary ammonium compound corresponding to the general formula

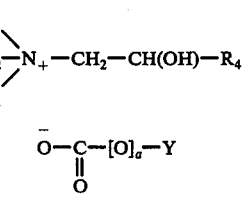

$$\bar{O}-\underset{\underset{O}{\|}}{C}-[O]_a-Y$$

wherein $a$ = zero or one $R_1$, $R_2$ and $R_3$ are independently alkyl or hydroxyalkyl of 1 to 20 carbon atoms, or cycloalkyl groups of 3 to 8 carbon atoms, aralkyl, aryl, alkenyl of 2 to 20 carbon atoms, or alkynyl of 2 to 6 carbon atoms, or $R_1$, $R_2$ and $R_3$ together constitute a heterocyclic structure from the group consisting of quinuclidine, N-methyl morpholine, N-ethyl morpholine and N,N'-dimethyl piperazine;

$R_4$ is H, phenyl, an alkyl group of 1 to 15 carbon atoms, an alkenyl group of 2 to 15 carbon atoms, an alkynyl group of 2 to 6 carbon atoms, a hydroxy alkyl group of 1 to 9 carbon atoms, a keto alkyl group having a total of 3 to 15 carbon atoms; or an alkoxy alkyl group having a total of 2 to 10 carbon atoms;

Y is H, an alkyl group of 1 to 20 carbon atoms, an alkenyl group of 2 to 15 carbon atoms, a cycloalkyl group of 3 to 6 carbon atoms, phenyl, an alkyl phenyl having 1 to 9 carbon atoms in the alkyl group or groups attached to the phenyl ring, benzyl, an alkyl benzyl having 1 to 9 carbon atoms in the alkyl group or groups attached to the ring, or a $CH_{(3-b)} Z_{(b)}$ group, wherein (3_b) b = 1 to 3 and Z is OH, CN, Cl, an alkoxy group of 1 to 5 carbon atoms, a phenyl group or methoxy phenyl group, or Z is $(CH_2)_d COOR,$ wherein $d$ is equal to zero to four and R is hydrogen or an alkyl group of up to 20 carbon atoms.

2. The method as defined in claim 1 wherein each of $R_1$, $R_2$, $R_3$ and $R_4$ is a short chain alkyl group of up to three carbon atoms.

3. The method as defined in claim 1 wherein said quaternary ammonium compound of the formula is a 2-hydroxy propyl trimethyl ammonium salt of an aliphatic carboxylic acid having a total of up to ten carbon atoms.

4. The method as defined in claim 3 wherein said acid is formic acid.

5. The method as defined in claim 3 wherein said acid is an isodecanoic acid.

6. The method as defined in claim 3 wherein said acid is 2-ethyl hexanoic acid.

7. The method as defined in claim 1 wherein a = zero.

8. In the production of foamed plastics by reaction of an organic diisocyanate compound with a high molecular weight polyol, the improvement which consists in utilizing as catalyst in said reaction a compound corresponding to the formula

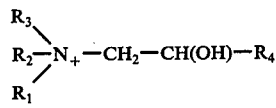

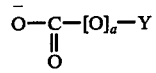

wherein
a = zero or one,
$R_1$, $R_2$ and $R_3$ are independently alkyl or hydroxy alkyl of 1 to 20 carbon atoms, or cycloalkyl groups of 3 to 8 carbon atoms, aralkyl, aryl, alkenyl of 2 to 20 carbon atoms, or alkynol of 2 to 6 carbon atoms, or
$R_1$, $R_2$ and $R_3$ together constitute a heterocyclic structure from the group consisting of quinuclidine, N-methyl morpholine, N-ethyl morpholine and N,N'-dimethyl piperazine;
$R_4$ is H, phenyl, an alkyl group of 1 to 15 carbon atoms, an alkenyl group of 2 to 15 carbon atoms, an alkynyl group of 2 to 6 carbon atoms, a hydroxy alkyl group of 1 to 9 carbon atoms, a keto alkyl group having a total of 3 to 15 carbon atoms, or an alkoxy alkyl group having a total of 2 to 20 carbon atoms;
Y is H, an alkyl group of 1 to 20 carbon atoms, an alkenyl group of 2 to 15 carbon atoms, a cycloalkyl group of 3 to 6 carbon atoms, phenyl, an alkyl phenyl having 1 to 9 carbon atoms in the alkyl group or groups attached to the phenyl ring, benzyl, an alkyl benzyl having 1 to 9 carbon atoms in the alkyl group or groups attached to the ring, or a $CH_{(3-b)} Z_{(b)}$ group, wherein $b$ = 1 to 3 and Z is OH, CN, Cl, an alkoxy group of 1 to 5 carbon atoms, a phenyl group or methoxy phenyl group, or Z is $(CH_2)_d COOR$, wherein $d$ is equal to zero to four and R is hydrogen or an alkyl group of up to 20 carbon atoms.

9. The process as defined in claim 8 wherein said foamed plastic is a polyurethane.

10. The process as defined in claim 8 wherein said foamed plastic comprises isocyanurate groups.

11. A process for the production of polyurethane plastics comprising the reaction of an aryl diisocyanate, a high molecular weight polyol and a catalytic quantity of a hydroxyalkyl quaternary ammonium compound corresponding to the formula

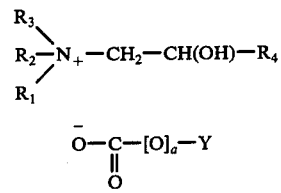

wherein
a = zero or one,
$R_1$, $R_2$ and $R_3$ are independently alkyl or hydroxyalkyl of 1 to 20 carbon atoms, or cycloalkyl groups of 3 to 8 carbon atoms, aralkyl, aryl, alkenyl of 2 to 20 carbon atoms, or alkynyl of 2 to 6 carbon atoms, or
$R_1$, $R_2$ and $R_3$ together constitute a heterocyclic structure from the group consisting of quinuclidine, N-methyl morpholine, N-ethyl morpholine and N,N'-dimethyl piperazine;
$R_4$ is H, phenyl, an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a keto alkyl group having a total of 3 to 15 carbon atoms, or an alkoxy alkyl group having a total of 2 to 20 carbon atoms;
Y is H, an alkyl group of 1 to 20 carbon atoms, an alkenyl group of 2 to 15 carbon atoms, a cycloakyl group of 3 to 6 carbon atoms, phenyl, an alkyl phenyl having 1 to 9 carbon atoms in the alkyl group or groups attached to the phenyl ring, benzyl, an alkyl benzyl having 1 to 9 carbon atoms in the alkyl group or groups attached to the ring, or a $CH_{(3-)} Z_{(b)}$ group, wherein $b$ = 1 to 3 and Z is OH, CN, Cl, an alkoxy group of 1 to 5 carbon atoms, a phenyl group or methoxy phenyl group, or Z is $(CH_2)_d COOR$, wherein $d$ is equal to zero to four and R is hydrogen or an alkyl group of up to 20 carbon atoms.

12. The process as defined in claim 11 wherein said quaternary ammonium compound of the formula is a 2-hydroxypropyl trimethyl ammonium salt of an aliphatic carboxylic acid.

13. The process as defined in claim 12 wherein said acid is formic acid.

14. The process as defined in claim 12 wherein said acid is an octanoic acid.

15. The process as defined in claim 11 wherein said quaternary compound of the formula is a salt of glycolic acid.

16. A process for production of blown polyisocyanurate resins comprising the reaction of an organic diisocyanate, a high molecular weight polyol, a blowing agent, and a catalytic quantity of a hydroxyalkyl quaternary ammonium compound corresponding to the general formula

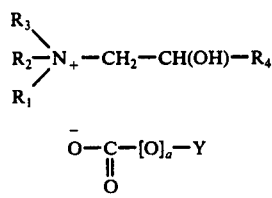

$$O-\underset{\underset{O}{\|}}{C}-[O]_a-Y$$

wherein a = zero or one, $R_1$, $R_2$ and $R_3$ are independently alkyl or hydroxyalkyl of 1 to 20 carbon atoms, or cycloalkyl groups of 3 to 8 carbon atoms, aralkyl, aryl, alkenyl of 2 to 29 carbon atoms, or alkynyl of 2 to 6 carbon atoms, or $R_1$, $R_2$ and $R_3$ together constitute a heterocyclic structure from the group consisting of quinuclidine, N-methyl morpholine, N-ethyl morpholine and N,N'-dimethyl piperazine;

$R_4$ is H, phenyl, an alkyl group of 1 to 15 carbon atoms, an alkenyl group of 2 to 15 carbon atoms, an alkynyl group of 2 to 6 carbon atoms, a hydroxyalkyl group of 1 to 9 carbon atoms, a keto alkyl group having a total of 3 to 15 carbon atoms, or an alkoxy alkyl group having a total of 2 to 20 carbon atoms;

Y is H, an alkyl group of 1 to 20 carbon atoms, an alkenyl group of 2 to 15 carbon atoms, a cycloalkyl group of 3 to 6 carbon atoms, phenyl, an alkyl phenyl having 1 to 9 carbon atoms in the alkyl group or groups attached to the phenyl ring, benzyl, an alkyl benzyl having 1 to 9 carbon atoms in the alkyl group or groups attached to the ring, or a $CH_{(3-)} Z_{(b)}$ groups, wherein b = 1 to 3 and Z is OH, CN, Cl, an alkoxy group of 1 to 5 carbon atoms, a phenyl group or methoxy phenyl group, or Z is $(CH_2)_d COOR$, wherein d is equal to zero to four and R is hydrogen or an alkyl group of up to 20 carbon atoms.

17. The process as defined in claim 16 wherein at least two of $R_1$, $R_2$ and $R_3$ are short chain alkyl groups of up to three carbon atoms.

18. The process as defined in claim 16 wherein $R_4$ is a short chain alkyl group of up to three carbon atoms.

19. The process as defined in claim 16 wherein $R_4$ is methyl.

20. The process as defined in claim 16 wherein said quaternary ammonium compound of the formula is an aliphatic acid salt of a hydroxy alkyl trimethyl ammonium compound.

21. The process as defined in claim 20 wherein said acid is formic acid.

22. The process as defined in claim 20 wherein said acid is a fatty acid having 8 to 10 carbon atoms.

23. The process as defined in claim 20 wherein said acid is 2-ethyl hexanoic acid.

24. In the method of trimerizing aliphatic and aralkyl diisocyanates selected from the group consisting of isophorone diisocyanate, hexamethylene diisocyanate, methylene bis cyclohexyl diisocyanate, xylylene diisocyanate, and mixture thereof the improvement which comprises promoting and trimerization by a catalystic quantity of a fully substituted quaternary ammonium carboxylate having 1 to 2 hydroxyl alkyl groups attached to the quaternary nitroben having the formula:

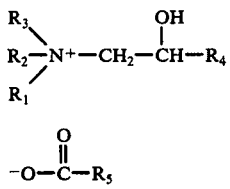

wherein $R_1$, $R_2$, $R_3$ and $R_4$ are short chain alkyl groups having up to 3 carbon atoms, and $R_5$ is H, an alkyl group of 1 to 18 carbon atoms, alkynyl group of 2 to 15 carbon atoms, benzyl or methoxy benzyl.

25. In the process of promoting organic isocyanate condensation and/or polymerization reactions in the production of products containing respectively urethane and isocyanurate groups, the improvement which consists in utilizing for such promotion a catalyst quantity of a hydroxyl alkyl quaternary ammonium compound corresponding to the formula

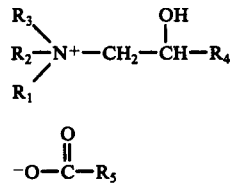

wherein $R_1$, $R_2$ and $R_3$ are independently alkyl or hydroxyalkyl groups of 1 to 20 carbon atoms, or cycloalkyl groups of 3 to 8 carbon atoms, aralkyl, aryl, alkenyl of 2 to 20 carbon atoms, or alkynyl of 2to 6 carbon atoms, or $R_1$, $R_2$ and $R_3$ together constitute a heterocyclic structure from the group consisting of quinuclidine, N-methyl morpholine, N-ethyl morpholine and N,N'-dimethyl piperazine;

$R_4$ is H, phenyl an alkyl group of 1 to 15 carbon atoms, an alkenyl group of 2 to 15 carbon atoms, an alkynol group of 2 to 6 carbon atoms, a hydroxy alkyl group of 1 to 9 carbon atoms, a keto alkyl group having a total of 3 to 15 carbon atoms, or an alkoxy alkyl group having a total of 2 to 20 carbon atoms and $R_5$ is H, an alkyl group of 1 to 18 carbon atoms, alkenyl group of 2 to 15 carbon atoms, benzyl or methoxy benzyl.

* * * * *

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 2, delete Formula and substitute therefor:

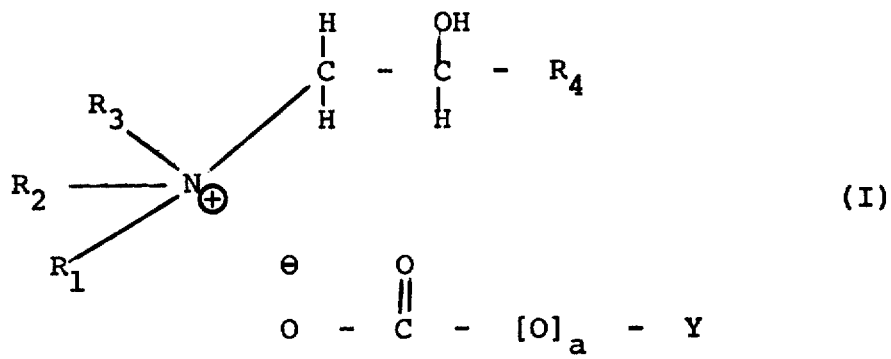

Column 2, Line 52
    Delete "quinaclidine" and substitute therefor
    -- quinuclidine --

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 3, delete Formula and substitute therefor:

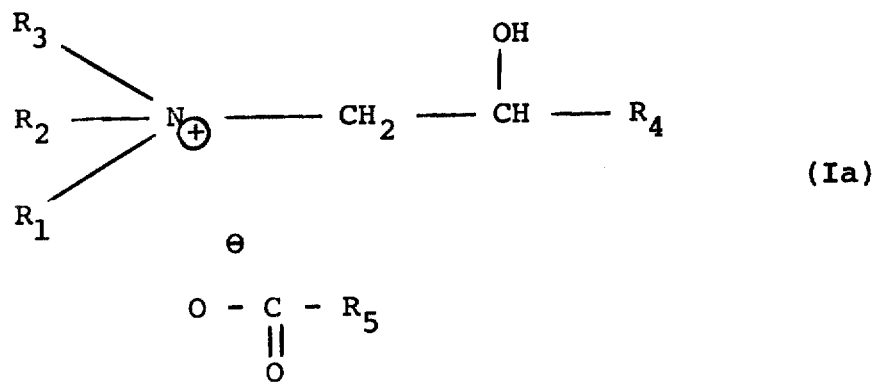

Column 3, Line 36
    Delete "without" and substitute therefor -- within --

Column 3, Line 38
    Delete "or" and substitute therefor -- of --

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 5, Line 21
  Delete
"N-methyl   cyano-     propylene    30.6   22.2   47   5"
                       DPG
 morpholine acetic and substitute therefor:

-- N-methyl   cyano-    propylene    DPG    30.6   22.2   47   5 --
   morpholine acetic Column 5, delete Formula and substitute therefor:

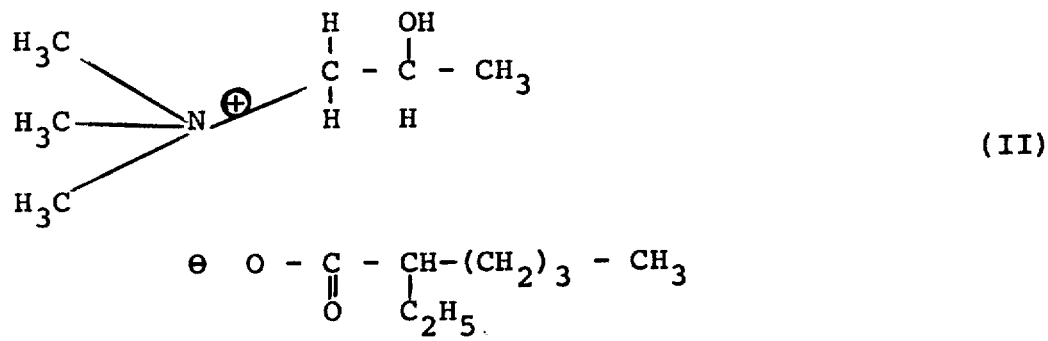

(II)

UNITED STATES PATENT AND TRADEMARK OFFICE
CERTIFICATE OF CORRECTION

PATENT NO. : 4,040,992  Page 4 of 25
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 6, delete Formula and substitute therefor:

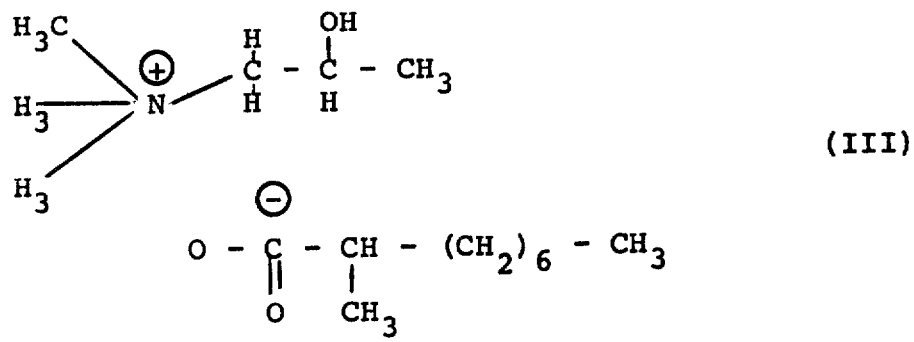

(III)

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 6, Table 2, Functional Group Column (Formula II) should read as follows:

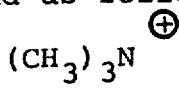

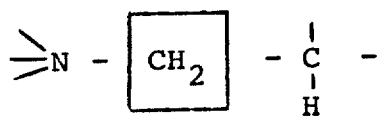

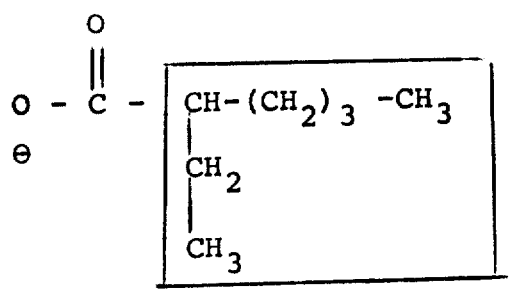

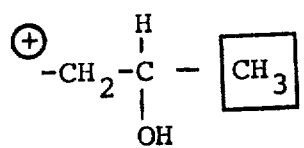

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 6, and Column 7, Table 2, Functional Group Column (Formula III) should read as follows:

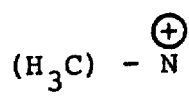

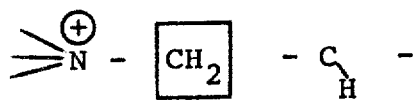

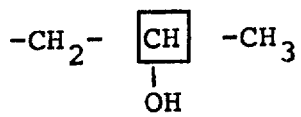

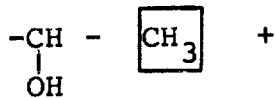

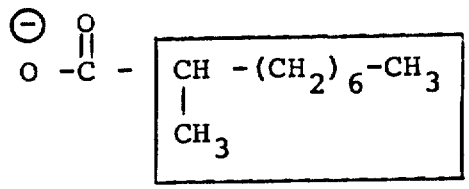

UNITED STATES PATENT AND TRADEMARK OFFICE
CERTIFICATE OF CORRECTION

PATENT NO. : 4,040,992
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 7, delete Formula and substitute therefor:

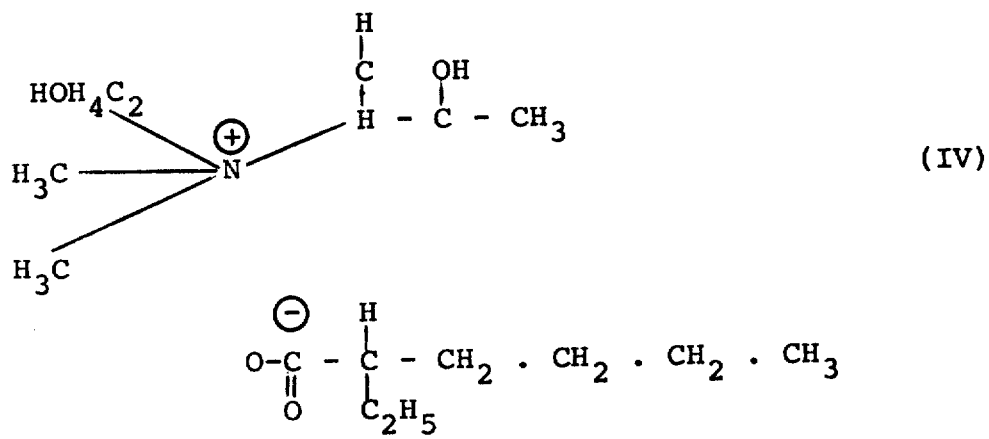

(IV)

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Columns 8 and 9, Table 3, Functional Group Column (Formula V) should read as follows:

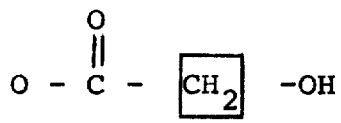

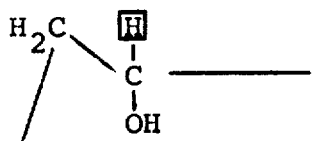

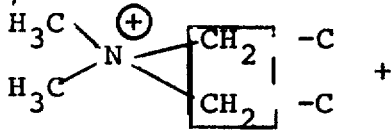

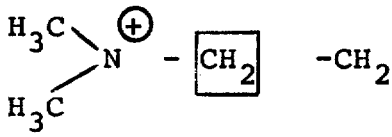

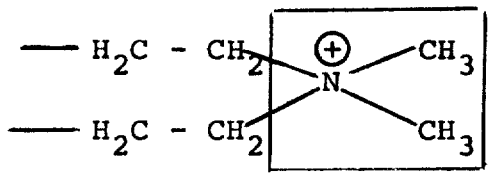

UNITED STATES PATENT AND TRADEMARK OFFICE
CERTIFICATE OF CORRECTION

PATENT NO.   : 4,040,992

DATED        : August 9, 1977

INVENTOR(S)  : I. S. Bechara, F. P. Carroll, D. G. Holland, and R. L. Mascioli

It is certified that error appears in the above-identified patent and that said Letters Patent are hereby corrected as shown below:

Columns 8 and 9, Table 3, Functional Group Column (Formula v) should read as follows (contined):

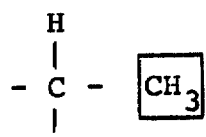

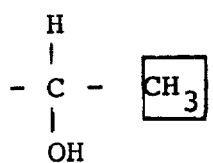

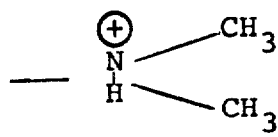

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 9, Example 10, delete Formula and substitute therefor:

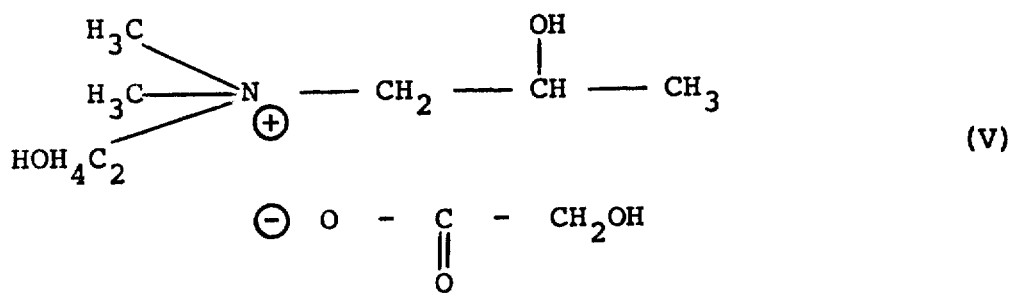

Column 9, Example 11, delete Formula and substitute therefor:

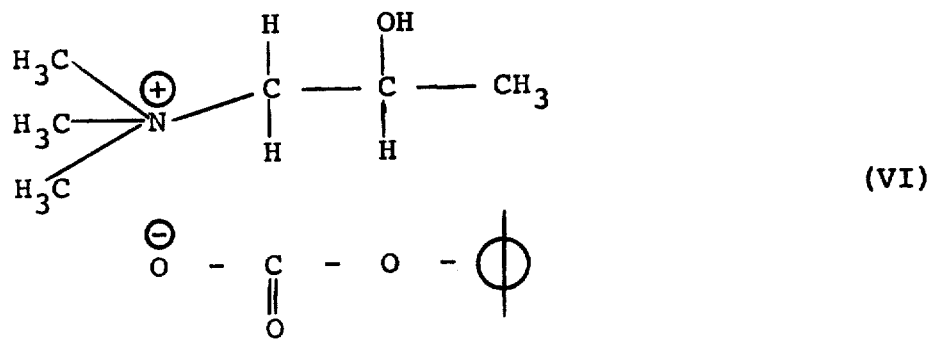

UNITED STATES PATENT AND TRADEMARK OFFICE
CERTIFICATE OF CORRECTION

PATENT NO. : 4,040,992
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 10, Example 12, delete Formula and substitute therefor:

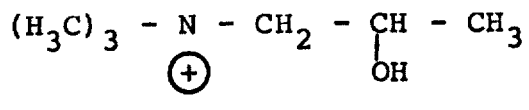

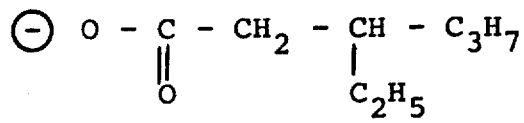

(VII)

Column 10, Example 13, delete Formula and substitute therefor:

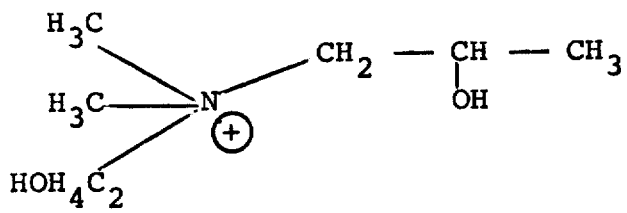

(VIII)

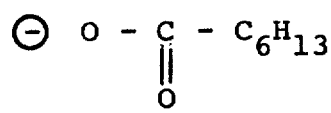

UNITED STATES PATENT AND TRADEMARK OFFICE
CERTIFICATE OF CORRECTION

PATENT NO. : 4,040,992
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 10, Example 14, delete Formula and substitute therefor:

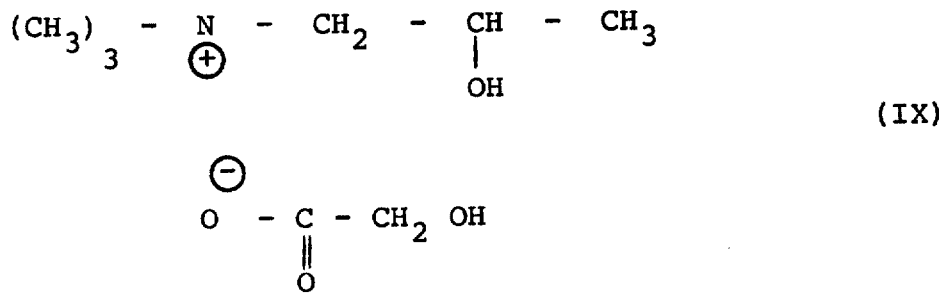

(IX)

Column 11, Example 15 (second part of Formula), delete and substitute therefor:

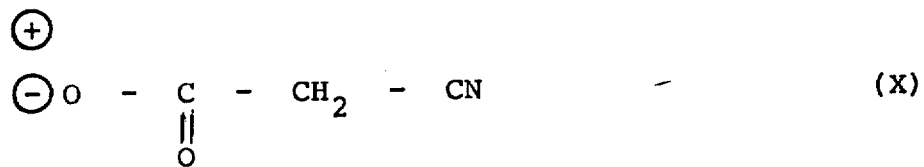

(X)

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 11, Example 16, delete Formula and substitute therefor:

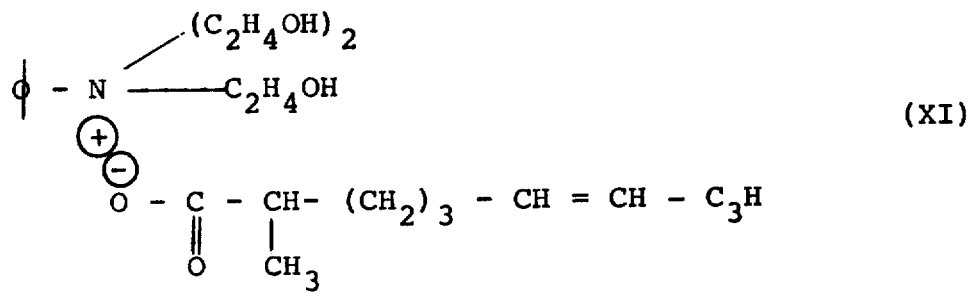

Column 11, Example 17, delete Formula and substitute therefor:

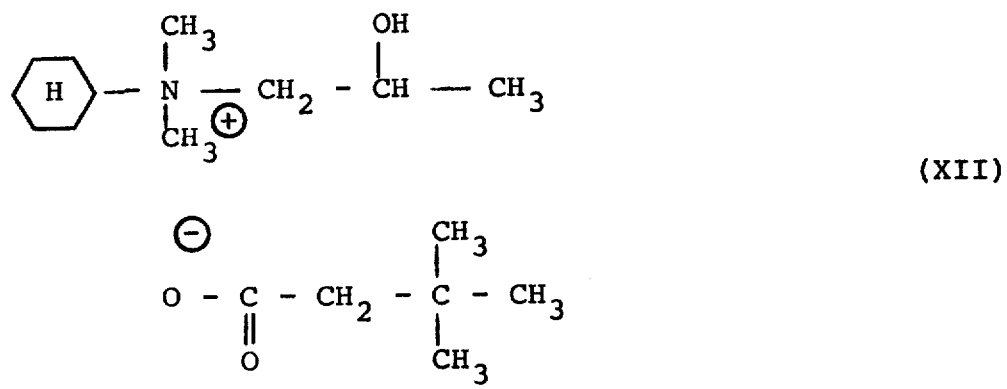

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 11, Example 18, delete Formulae and substitute therefor:

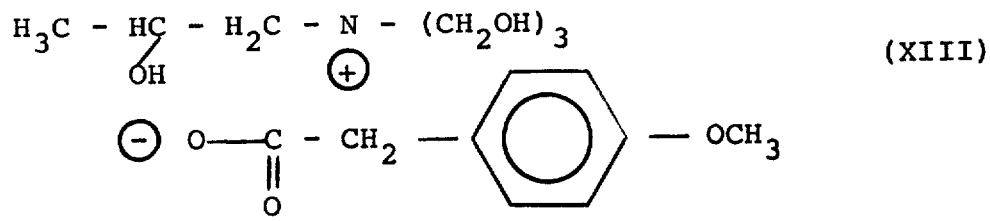

(XIII)

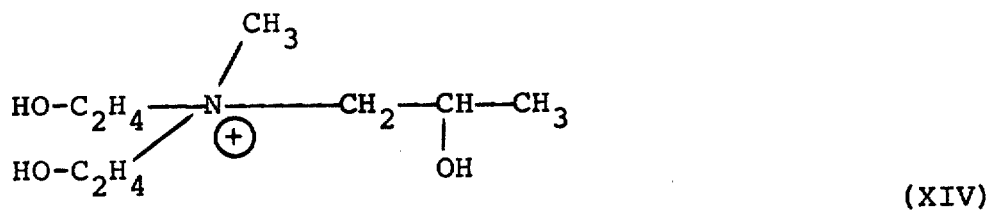

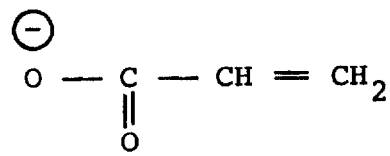

(XIV)

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 12, Example 18 (con't), delete Formulae and substitute therefor:

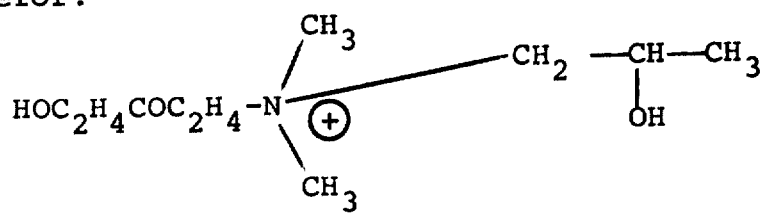

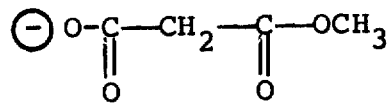

(XV)

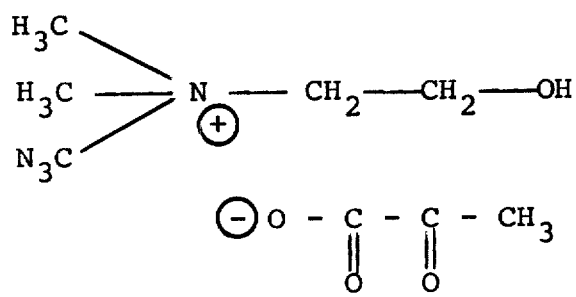

(XVI)

UNITED STATES PATENT AND TRADEMARK OFFICE
CERTIFICATE OF CORRECTION

PATENT NO. : 4,040,992
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 12, Example 18 (con't), delete Formulae and substitute therefor:

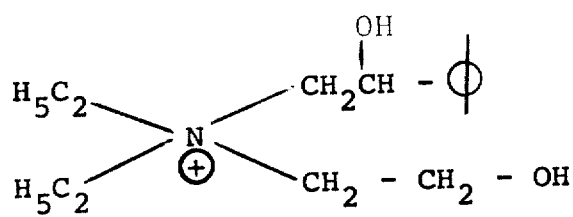

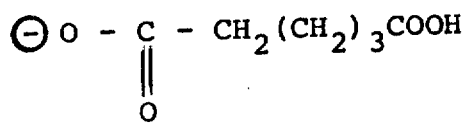

(XVII)

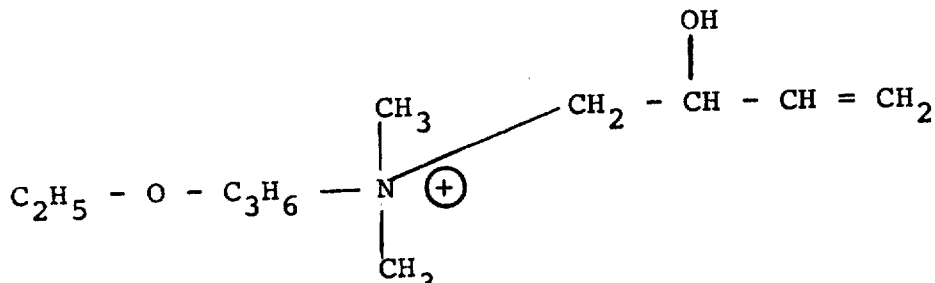

(XVIII)

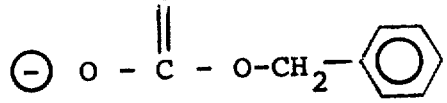

UNITED STATES PATENT AND TRADEMARK OFFICE
CERTIFICATE OF CORRECTION

PATENT NO. : 4,040,992
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 12, Example 18 (con't), delete Formula and substitute therefor:

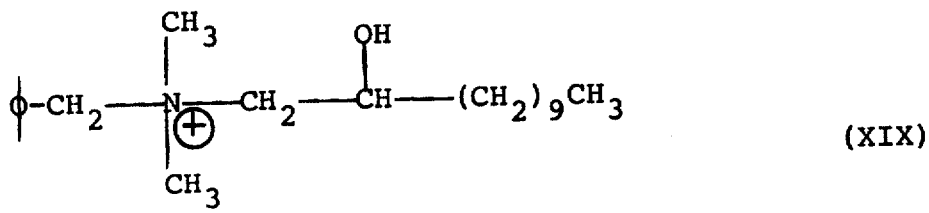

(XIX)

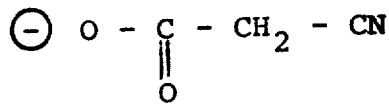

Column 13, Example 18 (con't), delete Formula and substitute therefor:

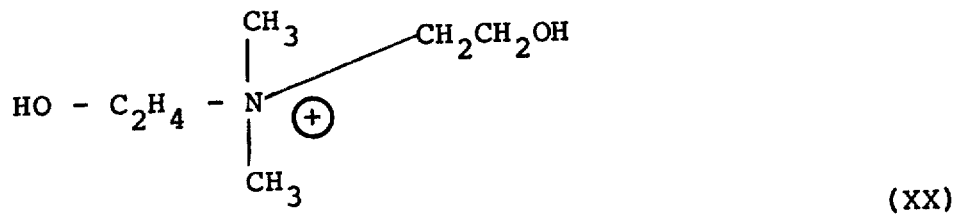

(XX)

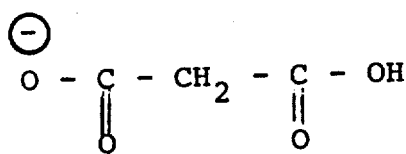

UNITED STATES PATENT AND TRADEMARK OFFICE
CERTIFICATE OF CORRECTION

PATENT NO. : 4,040,992
DATED : August 9, 1977
INVENTOR(S) : I. S. Bechara, F. P. Carroll, D. G. Holland, and R. L. Mascioli It is certified that error appears in the above-identified patent and that said Letters Patent are hereby corrected as shown below:

Column 13, Example 18 (con't), delete Formulae and substitute therefor:

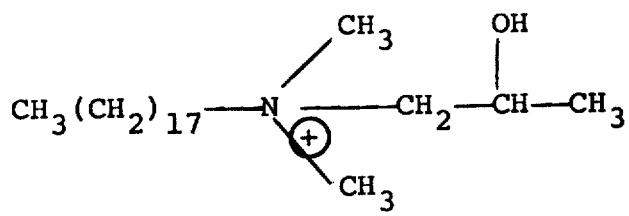

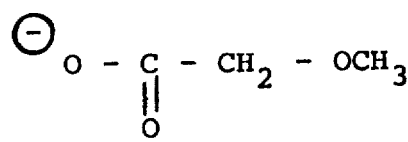

(XXI)

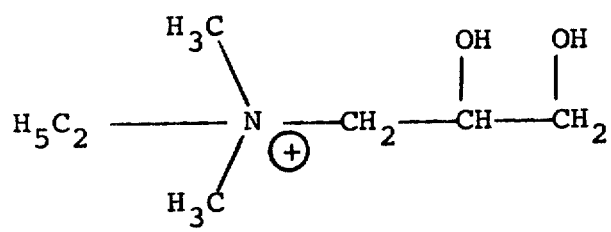

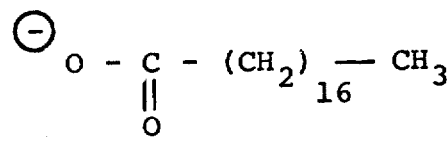

(XXII)

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 13, Line 56
    Delete "tris" and substitute therefor -- alone --

Column 13, Line 62
    Delete "-tris" and substitute therefor -- tris --

Column 14, Line 31
    Delete "Mondur MR" and substitute therefor -- Mondur MR® --

Column 14, Line 32
    Delete "Voranol RS-350" and substitute therefor
    -- Voranol® RS-350 --

Column 14, Line 33
    Delete "Genetron 11SBA" and substitute therefor
    -- Genetron® 11SBA --

Column 15, Line 14
    Add -- EXAMPLE 22 --

Column 15, Line 17
    Delete "*Selectrofoam 6406" and substitute therefor
    -- *Selectrofoam® 6406 --

Column 15, Line 19
    Delete "*Hylene TIC" and substitute therefor
    -- *Hylene® TIC --

Column 15, Line 26
    Delete "EXAMPLE 22"

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 16, Line 27
   Delete "LK-221" and substitute therefor -- LK-221® --

Column 18, Line 30 (Claim 1) delete Formula and substitute therefor:

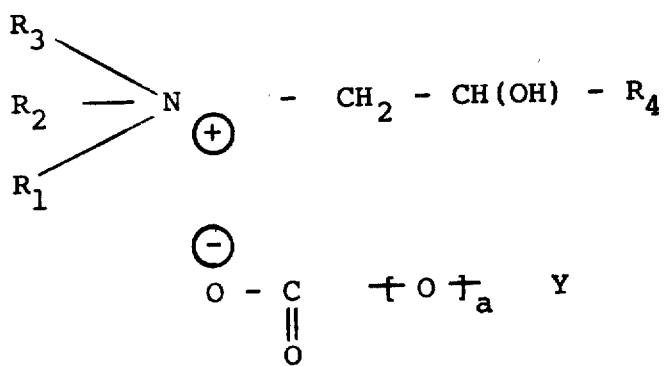

Column 18, Line 52 (Claim 1)
   Delete "10" and substitute therefor -- 20 --

Column 18, Line 64
   Delete "(3_b)"

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 19, Line 20 (Claim 8)
    Delete "diisocyanate" and substitute therefor
    -- polyisocyanate --

Column 19, Line 25 (Claim 8), delete Formula and substitute therefor:

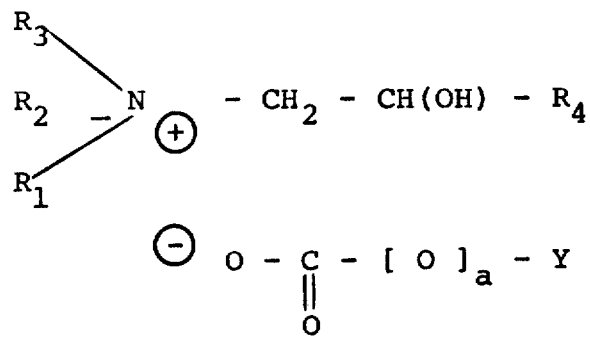

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 20, Line 7 (Claim 11)
  Delete "diisocyanate" and substitute therefor
  -- polyisocyanate --

Column 20, Line 11 (Claim 11), delete Formula and substitute therefor:

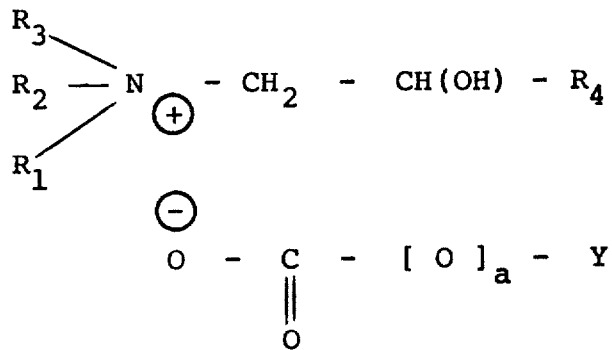

Column 20, Line 44
  Delete "$CH_{(3-)}Z_{(b)}$ group" and substitute therefor
  -- $CH_{(3-B)}Z_{(b)}$ group --

Column 20, Line 66-67
  Delete "diisocyanate" and substitute therefor
  -- polyisocyanate --

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 21, Line 4 (Claim 16), delete Formula and substitute therefor:

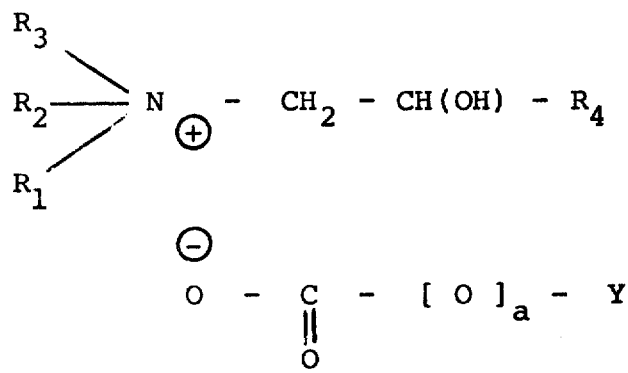

Column 21, Line 36
 Delete "$CH_{(3-)}Z_{(b)}$ groups" and substitute therefor
 -- $CH_{(3-B)}Z_{(b)}$ group --

Column 22, Line 3
 Delete "diisocyanates" and substitute therefor
 -- polyisocyanates --

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 22, Line 7
    Delete "and" and substitute therefor -- said --

Column 22, Line 7
    Delete "catalystic" and substitute therefor -- catalytic --

Column 22, Line 10
    Delete "nitroben" and substitute therefor -- nitrogen --

Column 22, Line 12 (Claim 24), delete Formula and substitute therefor:

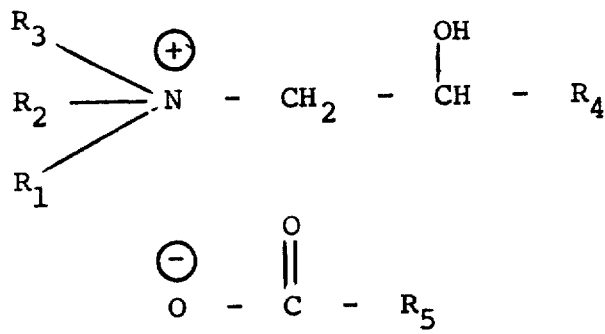

UNITED STATES PATENT AND TRADEMARK OFFICE
CERTIFICATE OF CORRECTION

PATENT NO. : 4,040,992

DATED : August 9, 1977

INVENTOR(S) : I. S. Bechara, F. P. Carroll, D. G. Holland, and R. L. Mascioli

It is certified that error appears in the above-identified patent and that said Letters Patent are hereby corrected as shown below:

Column 22, Line 34 (Claim 25), delete Formula and substitute therefor:

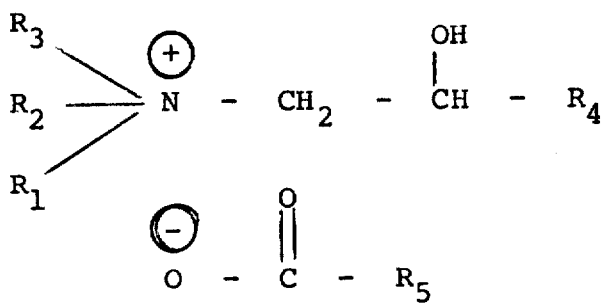

Signed and Sealed this

Eighteenth Day of April 1978

[SEAL]

Attest:

RUTH C. MASON
Attesting Officer

LUTRELLE F. PARKER
Acting Commissioner of Patents and Trademarks